April 16, 1929.    F. KOCH    1,709,025

PASSAGEWAY MEMBER FOR AN ARTICULATED CAR UNIT

Filed May 23, 1928    2 Sheets-Sheet 1

INVENTOR

April 16, 1929. F. KOCH 1,709,025
PASSAGEWAY MEMBER FOR AN ARTICULATED CAR UNIT
Filed May 23, 1928 2 Sheets-Sheet 2
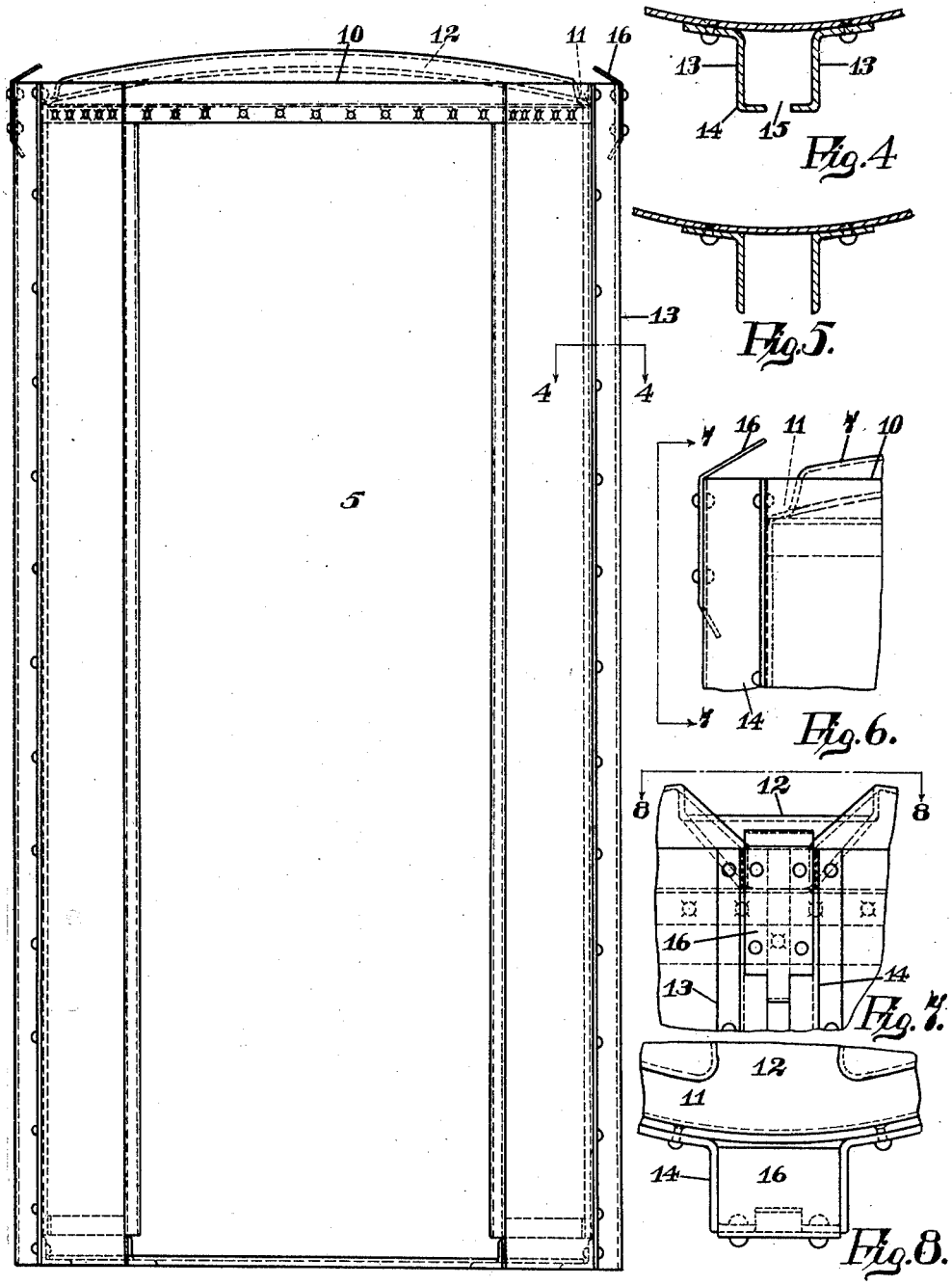

Patented Apr. 16, 1929.

1,709,025

UNITED STATES PATENT OFFICE.

FELIX KOCH, OF BELLEVUE, PENNSYLVANIA, ASSIGNOR TO PRESSED STEEL CAR COMPANY, OF PITTSBURGH, PENNSYLVANIA, A CORPORATION OF NEW JERSEY.

PASSAGEWAY MEMBER FOR AN ARTICULATED CAR UNIT.

Application filed May 23, 1928. Serial No. 280,001.

An object of my invention is to provide means on the passageway member for guiding and facilitating the removal of the drain water gathered by the passageway member as the result of rainfall or other causes.

Another object of my invention is to provide a down conductor at the side of the passageway member which is accessible for the removal of any débris which may be carried in by the drain water.

Another object of my invention is to provide spaced members forming a channel at the side of the passageway member to guide the drain water down the side of said passageway member.

Figure 1:
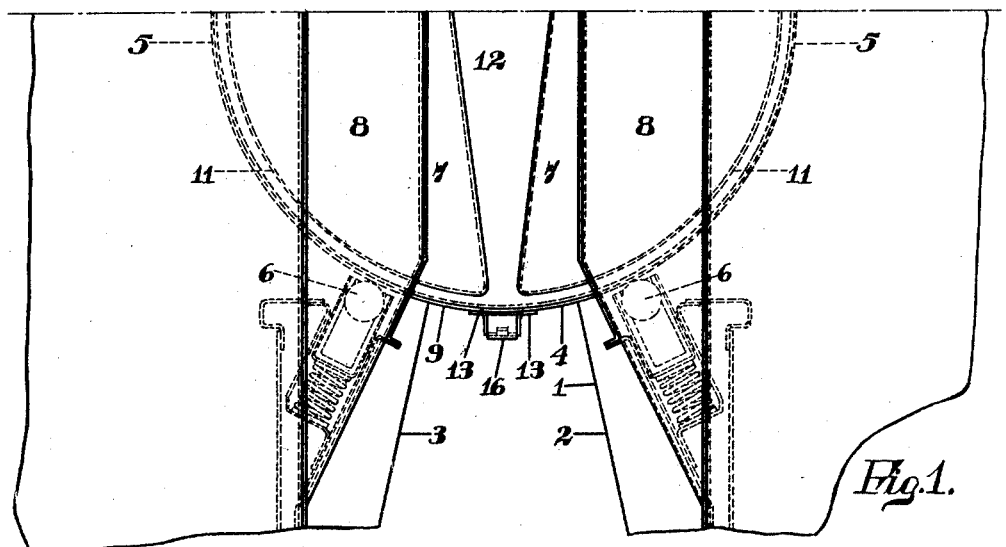
Figure 2:
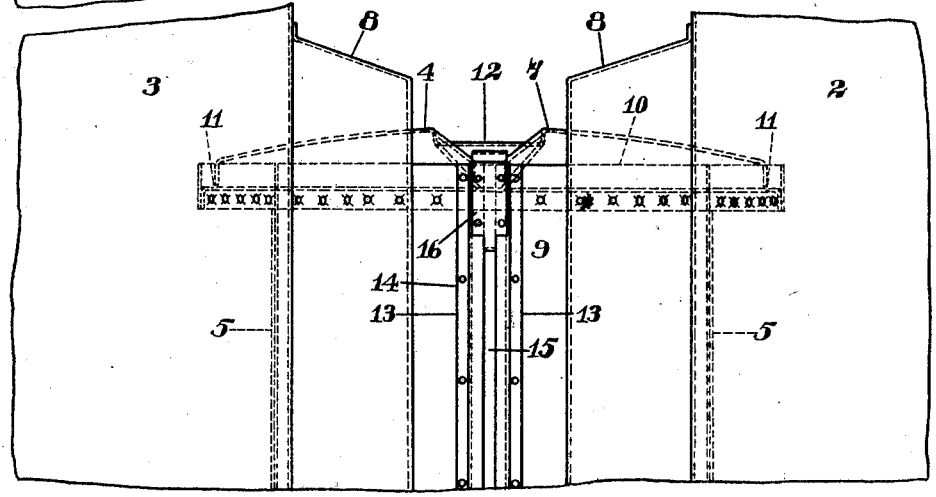

Referring now to the drawings, Fig. 1 is a plan view of a portion of an articulated car unit showing the relation of the roofs of the adjacent car bodies to the roof of the passageway member and drain; Fig. 2 shows in elevation a portion of the side of an articulated car unit and the passageway drain; Fig. 3 is another view of the passageway member and drain; Fig. 4 is a section through the down conductor taken along the lines 4—4 of Fig. 3; Fig. 5 is a modification of the section of the down conductor shown in Fig. 4; Fig. 6 is an enlarged view of the top of the down conductor and of a portion of the passageway member; Fig. 7 is a view taken along the lines 7—7 of Fig. 6; Fig. 8 shows the top of the down conductor taken along the lines 8—8 of Fig. 7.

Referring now in detail to the drawings where like reference characters refer to like parts, reference character 1 indicates a portion of an aticulated car unit comprising car bodies 2 and 3 having a passageway member 4 between and extending into said car bodies. Openings 5 in the passageway member form connections between the interior of that member with the interior of the adjacent car bodies 2 and 3, and at the side portions intermediate said openings and within the car bodies are weatherproofing members 6 which form weatherproof seals between the sides of the passageway member and the car bodies.

The roof of the passageway member is preferably made in the form of an arc of a circle in cross section and is overlapped at opposite sides by the ends 8 of the adjacent car bodies as shown in Figs. 1 and 2. The periphery of the arc-like roof is constructed with a substantially vertical flange 10, which is connected to the vertical sides of the passageway member, forming a peripheral depression 11 which forms a gutter for the reception of the drain water. The cross gutter 12 running from side to side of the passageway member connects with the peripheral gutter 11.

Secured to the sides 9 of the passageway member and extending throughout the length thereof are suitably spaced shaped members 13 which form a channel 14 which connects the gutter 11, through appropriate openings in the member 10, with the lower portion of the passageway member and conducts the drain water down the sides of the passageway member. These members 13 are also spaced apart so as to form an opening 15 the entire length of the down conductor to make the interior thereof accessible for cleaning out any débris which may tend to accumulate therein. It is to be understood, however, that the members 13 need not be Z-shaped as shown but may be angles, as illustrated by Fig. 5, or any other suitable means which will serve a similar purpose. Attached to the upper portion of the down conductor 14 and extending over the end thereof is a baffle member 16 which directs the drain water from the depression 12 and gutter 11 into the down conductor and prevents the water from running promiscuously down the sides of the passageway.

Passageway members having no provision for confining and conducting drain water away from said member, permitted the water from the roofs of the car bodies to flow over the sides of the passageway member. Whenever a considerable quantity of water was thus flowing down the side of the passageway, a certain amount thereof was liable to pass between or around the weatherproofing members and cause the presence of moisture inside the car bodies which is liable to soil the clothing of the passengers and be otherwise undesirable. Likewise an excess of moisture is injurious to the finish of both the insides of the car bodies and the outside of the passageway member, hence, the need for a device of the character above described for conducting the drain water from the roof of the passageway and down the sides thereof in a manner suitable to prevent the water from gaining access to the interior of the car bodies.

Having thus described the invention what I claim as new and desire to secure by Letters Patent is:

1. In an articulated car unit, a passageway member between the adjacent ends of the adjacent car bodies, open means on said passageway member directing the flow of drain water from the roof, down the outside of said member.

2. The combination in an articulated car unit of a passageway member between the adjacent ends of adjacent car bodies, and means on said member for directing the flow of drain water from said member, said means comprising a peripheral collector at the top connected with an open down conductor on the outside of said passageway member.

3. In an articulated car unit, a passageway member between the adjacent ends of adjacent car bodies, means on said passageway member for directing the removal of drain water, said means comprising a peripheral water collector at the top connected with a down conductor at the side of the passageway member, said down conductor having its interior accessible from the side.

4. A drain for the passageway member of an articulated car unit, said drain comprising means at the top of said passageway member for collecting and directing drain water, connected to a down conductor at the side of the passageway member, said down conductor comprising spaced shaped members extending throughout the length of the side of the passageway, the interior of said conductor being readily accessible.

5. The combination in a passageway member of an articulated car unit, of a gutter formed around the periphery of the roof of said passageway, a transverse depression in said roof and a down conductor at the side of said passageway connected with said gutter, said down conductor having its interior accessible throughout its length.

6. The combination in a passageway member of an articulated car unit, of a sloping roof, a gutter formed around the periphery of said roof, a transverse conductor on said roof and a member at the side of said passageway connecting the base thereof with an opening in the said peripheral gutter.

In testimony whereof I affix my signature.

FELIX KOCH